C. E. BALLARD & E. F. SCHUMACHER.
JOURNAL BEARING.
APPLICATION FILED MAR. 8, 1912.
1,049,439.
Patented Jan. 7, 1913.
2 SHEETS—SHEET 1.
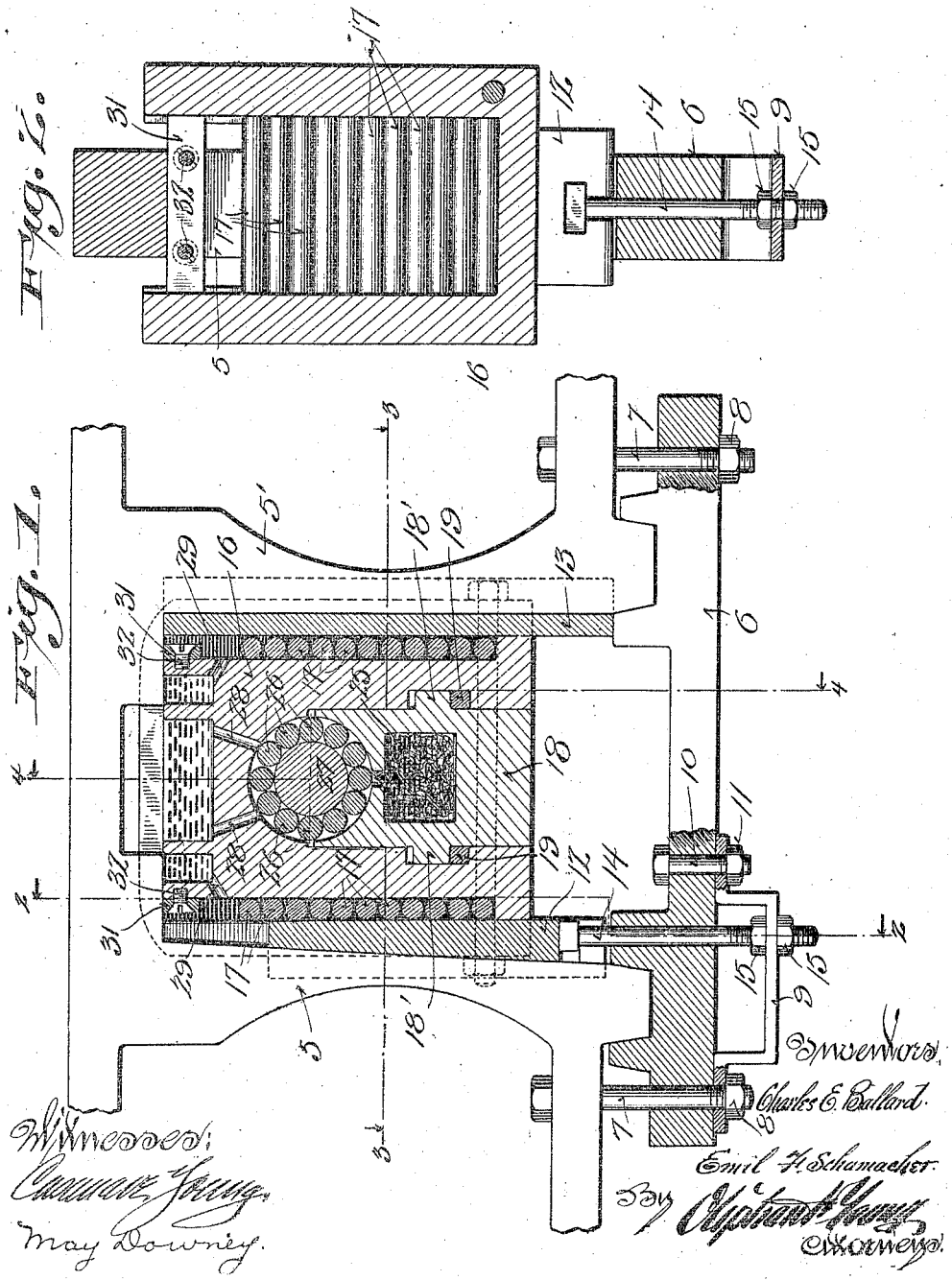

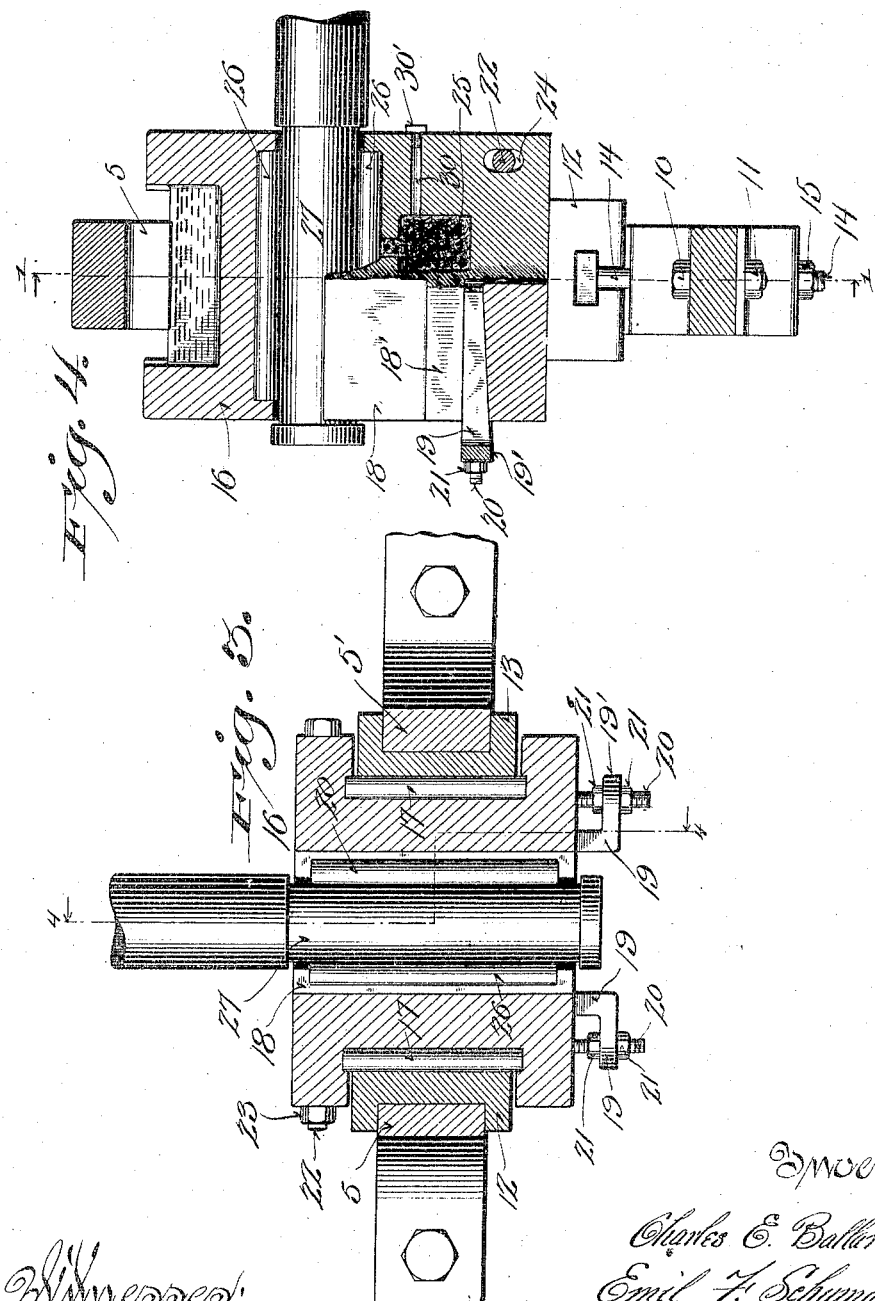

UNITED STATES PATENT OFFICE.

CHARLES E. BALLARD AND EMIL F. SCHUMACHER, OF MILWAUKEE, WISCONSIN.

JOURNAL-BEARING.

1,049,439.   Specification of Letters Patent.   Patented Jan. 7, 1913.

Application filed March 8, 1912. Serial No. 682,490.

*To all whom it may concern:*

Be it known that we, CHARLES E. BALLARD and EMIL F. SCHUMACHER, both citizens of the United States, and residents of Milwaukee, in the county of Milwaukee and State of Wisconsin, have invented certain new and useful Improvements in Journal-Bearings; and we do hereby declare that the following is a full, clear, and exact description thereof.

Our invention consists in what is herein particularly set forth with reference to the accompanying drawings and pointed out in the claim of this specification, its object being to provide simple, economical and efficient self-lubricating journal boxes especially designed for the journals of locomotive driving-wheels, the employment of said boxes serving to do away with brass bearing blocks, overcome lost motion and effect a saving of lubricating oil.

Figure 1 of the drawings represents a sectional view of one of our improved journal-boxes and parts therewith generally indicated by line 1—1 in Fig. 4, the frame-jaws in the showing being in side elevation and a binder partly so; Figs. 2 and 3 sectional views respectively indicated by lines 2—2 and 3—3 in Fig. 1, and Fig. 4, a similar view generally indicated by line 4—4 in Figs. 1 and 3, part of a cellar-block in the view being in elevation.

Referring by numerals to the drawings, 5, 5', indicate opposite jaws of a locomotive bearing-frame and 6 a binder provided with seats with which the lower extremities of the jaws are engaged. The bearing-frame is held in connection with the binder by means of bolts 7 and nuts 8, one of the bolts being extended through one end of a strap 9 that has its other end secured to said binder by a bolt 10 and a nut 11.

In straddling sliding engagement with the jaw 5 is a flanged wedge 12, and in like engagement with the jaw 5' is a flanged shoe 13 that rests upon the binder. Engaging a T-slot in the lower end of the wedge is the head and shank of a bolt 14 that extends through the binder 6 and the strap 9, set-nuts 15 being arranged on the bolt to oppose opposite sides of said strap.

Astraddle of the wedge 12, and the shoe 13, are the flanged ends of a recessed and grooved vertical play bearing-block 16, and anti-friction rollers 17 are interposed between the block and said wedge and shoe, the ends of the rollers being engaged with the vertical grooves of said block.

Fitting the bearing-block 16 is a flanged cellar-block 18 having flanges 18' opposed to wedges 19 engaging bearing-block grooves with which said flanges are also engaged. The wedges have outer end flanges 19' and screws 20, set in the bearing-block 16, extend through said flanges. Set-nuts 21 on the screws oppose opposite sides of the wedge-flanges and serve to determine the adjustment of the wedges. To hold the cellar-block in its engagement with the bearing block, a bolt 22 and a nut 23 are employed. To permit vertical adjustment of the cellar-block, the bolt aperture 24 therein is elongated as shown in Fig. 4.

The cellar of the block 18 is filled with wicking 25, and one end of the same extends through a passage from said cellar to have contact with anti-friction rollers 26 surrounding a journal 27 between said block and the bearing-block 16, which bearing-block is provided at its upper end with oil-cells having ports 28, 29, that lead respectively to the spaces in which the anti-friction rollers 17 and 26 are confined. An oil-port 30 is provided in the block 18 communicating with the cellar for the wicking 25, and a screw-stopper 30' is employed to close said port.

Stop-cleats 31 are held by screws 32 in connection with the bearing-block 16 in opposition to the uppermost anti-friction rollers 17 and the ends of the anti-friction rollers 26 are confined in registering spaces of said bearing-block and the cellar-block.

The wedges 19 are adjusted to elevate the cellar block 18, in order to compensate for wear of said block, the anti-friction rollers 26 and the bearing block 16, said rollers being lubricated from an oil-cell of said bearing-block and from the wick-cellar. The wedge 12 is adjusted to compensate for wear of the same, the anti-friction rollers 17, bearing-block 16 and shoe 13, lubricant being supplied to said rollers from oil-cells of said block. The adjustment of the wedges may be readily effected and lost motion in the bearing prevented. Excess oil from the cells in the bearing-block is caught in the wicking and cellar to be returned again, by capillary attraction of the wicking, to the anti-friction rollers surrounding the journal, and but comparatively little oil is necessary for lubrication of the wedge and shoe opposing anti-friction rollers that are also in opposition to said bearing-block.

The general construction and arrangement of parts and the lubrication above specified are such that a satisfactory journal-box is provided without the employment of any brass whatever.

We claim:

The combination of a guide-frame, a bearing-block in anti-friction vertical play engagement with the frame, means by which to take up wear occurring between said frame and block, a cellar-block in vertically adjustable engagement with the bearing-block, a journal and anti-friction rollers surrounding the same intermediate of said blocks, and means for conveying lubricant from the cellar block to said rollers, the bearing-block being provided with upper oil-cells and passage therefrom to wearing surfaces.

In testimony that we claim the foregoing we have hereunto set our hands at Milwaukee in the county of Milwaukee and State of Wisconsin in the presence of two witnesses.

CHAS. E. BALLARD.
EMIL F. SCHUMACHER.

Witnesses:
N. E. OLIPHANT,
M. E. DOWNEY.